(12) United States Patent
Sharma et al.

(10) Patent No.: US 12,040,915 B1
(45) Date of Patent: Jul. 16, 2024

(54) SYSTEMS AND METHODS FOR USING SERVERLESS FUNCTIONS TO CALL MAINFRAME APPLICATION PROGRAMING INTERFACES

(71) Applicant: JPMORGAN CHASE BANK, N.A., New York, NY (US)

(72) Inventors: Mukesh Sharma, Wilmington, DE (US); Pothuleeraiah Muthakani, Newark, DE (US)

(73) Assignee: JPMORGAN CHASE BANK , N.A., New York, NY (US)

( * ) Notice: Subject to any disclaimer, the term of this patent is extended or adjusted under 35 U.S.C. 154(b) by 0 days.

(21) Appl. No.: 18/313,193

(22) Filed: May 5, 2023

(51) Int. Cl.
  *H04L 12/46* (2006.01)
  *G06F 9/54* (2006.01)

(52) U.S. Cl.
  CPC ............ *H04L 12/4641* (2013.01); *G06F 9/54* (2013.01); *H04L 12/4633* (2013.01)

(58) Field of Classification Search
  CPC .... H04L 12/4641; H04L 12/4633; G06F 9/54
  See application file for complete search history.

(56) References Cited

U.S. PATENT DOCUMENTS

| | | | | |
|---|---|---|---|---|
| 10,348,556 B2* | 7/2019 | Cheng | ............... | H04L 41/0803 |
| 10,862,852 B1* | 12/2020 | Thunga | ............... | H04L 67/565 |
| 11,108,884 B1* | 8/2021 | Sahoo | ............... | H04L 67/10 |
| 11,579,911 B1* | 2/2023 | Santos | ............... | G06F 9/45558 |
| 11,811,730 B1* | 11/2023 | Kandasamy | ........ | H04L 61/4511 |
| 2014/0282536 A1* | 9/2014 | Dave | ............... | G06Q 30/0631 718/1 |
| 2015/0256481 A1* | 9/2015 | Turovsky | ............... | H04L 47/83 709/226 |
| 2015/0341240 A1* | 11/2015 | Lyoob | ............... | G06Q 30/0631 709/201 |
| 2015/0341445 A1* | 11/2015 | Nikolov | ............... | H04L 67/10 709/203 |
| 2016/0197834 A1* | 7/2016 | Luft | ............... | H04L 12/46 709/223 |
| 2020/0213224 A1* | 7/2020 | Cheng | ............... | H04L 45/04 |
| 2021/0112000 A1* | 4/2021 | Forster | ............... | H04L 41/0895 |
| 2021/0117175 A1* | 4/2021 | Hall | ............... | H04L 63/0281 |
| 2021/0176224 A1* | 6/2021 | Ma | ............... | H04L 63/20 |
| 2021/0328893 A1* | 10/2021 | Cherkas | ............... | H04L 41/22 |
| 2021/0397494 A1* | 12/2021 | Graham | ............... | G06F 9/547 |

(Continued)

*Primary Examiner* — Blake J Rubin
(74) *Attorney, Agent, or Firm* — GREENBERG TRAURIG LLP

(57) ABSTRACT

A method may include: identifying, by an application in a private/public subnet of a virtual private cloud provided by a cloud provider, data to request from a mainframe in an on-premises data center; executing, by the application, an API call for the data to the on-premises data center via a transit gateway; routing, by the transit gateway, the API call to a customer gateway through a private network connection, wherein the customer gateway routes the API call to a load balancer for the on-premises data center; identifying, by the load balancer, one of a plurality of mainframe LPARs in the on-premises data center that stores the data; routing, by the load balancer, the API call to the identified mainframe LPAR, wherein the identified mainframe LPAR is configured to retrieve the data and return the data to the application via the API; and processing, by the application, the data.

12 Claims, 3 Drawing Sheets

(56) References Cited

U.S. PATENT DOCUMENTS

| | | | | |
|---|---|---|---|---|
| 2021/0409303 A1* | 12/2021 | Pande | ................. | H04L 12/4641 |
| 2022/0188004 A1* | 6/2022 | Groetzner | ............. | G06F 9/4406 |
| 2022/0231944 A1* | 7/2022 | Jindal | .................... | H04L 45/74 |
| 2023/0031741 A1* | 2/2023 | Tomar | ................... | G06F 3/0631 |
| 2023/0164059 A1* | 5/2023 | Dawani | .................. | H04L 45/22 |
| | | | | 370/392 |
| 2023/0281100 A1* | 9/2023 | Wells | ................. | G06F 11/0772 |
| | | | | 702/186 |

* cited by examiner

SYSTEMS AND METHODS FOR USING SERVERLESS FUNCTIONS TO CALL MAINFRAME APPLICATION PROGRAMING INTERFACES

BACKGROUND OF THE INVENTION

1. Field of the Invention

Embodiments relate generally to systems and methods for using serverless functions to call mainframe application programing interfaces.

2. Description of the Related Art

Organizations often have large data stores that houses legacy data in mainframe computers in on-premises data centers. While these organizations migrate their data from their local data centers to the cloud, cloud solution providers have designed and implemented innovative solutions to migrate mainframes data to cloud platforms. During the migration, however, reliable and secure access to the organization's data is uncertain.

SUMMARY OF THE INVENTION

Systems and methods for using serverless functions to call mainframe application programing interfaces (APIs) are disclosed. In one embodiment, a method for using serverless functions to call mainframe application programing interfaces may include: (1) identifying, by an application in a private or a public subnet of a virtual private cloud provided by a cloud provider, data to request from a mainframe in an on-premises data center; (2) executing, by the application, an API call for the data to the on-premises data center via a transit gateway; (3) routing, by the transit gateway, the API call to a customer gateway through a private network connection, wherein the customer gateway routes the API call to a load balancer for the on-premises data center; (4) identifying, by the load balancer, one of a plurality of mainframe logical partitions (LPARs) in the on-premises data center that stores the data; (5) routing, by the load balancer, the API call to the identified mainframe LPAR, wherein the identified mainframe LPAR is configured to retrieve the data and return the data to the application via the API; and (6) processing, by the application, the data.

In one embodiment, the load balancer routes the API call based on latency and/or a utilization of the mainframe LPARs.

In one embodiment, the load balancer retrieves a dynamic virtual IP address for the identified mainframe LPAR and uses the dynamic virtual IP address to communicate with the identified mainframe LPAR.

In one embodiment, the method may also include storing, by the application, the data and/or results of the processing of the data in the cloud.

According to another embodiment, a system may include: a plurality of on-premises data centers, each on-premises data center comprising a plurality of mainframe logical partitions (LPARs) and a load balancer that interfaces with the plurality of mainframe LPARs; a customer gateway in communication with the on-premises data centers; a cloud provider comprising a virtual private cloud and a transit gateway, the virtual private cloud executing an application; and a private network connection between the transit gateway and the customer gateway. The application identifies data to request from one of the on-premises data centers and executes an API call for the data to the on-premises data center via the transit gateway. The transit gateway routes the API call to the customer gateway through the private network connection. The customer gateway routes the API call to the load balancer for the on-premises data center. The load balancer identifies one of the plurality of mainframe LPARs in the on-premises data center that stores the data and routes the request to the identified mainframe LPAR. The identified mainframe LPAR retrieves and returns the data to the application via the API. And the application processes the data.

In one embodiment, the load balancer routes the API call based on a latency and/or utilization of the mainframe LPARs.

In one embodiment, the load balancer retrieves a dynamic virtual IP address for the identified mainframe LPAR and uses the dynamic virtual IP address to communicate with the identified mainframe LPAR.

In one embodiment, the application stores the data and/or results of the processing of the data in the cloud.

According to another embodiment, a non-transitory computer readable storage medium, may include instructions stored thereon, which when read and executed by one or more computer processors, cause the one or more computer processors to perform steps comprising: identifying data to request from a mainframe in an on-premises data center; executing an API call for the data to the on-premises data center via a transit gateway; routing the API call to a customer gateway through a private network connection, wherein the customer gateway is configured to route the API call to a load balancer for the on-premises data center; identifying one of a plurality of mainframe logical partitions (LPARs) in the on-premises data center that stores the data; routing the API call to the identified mainframe LPAR, wherein the identified mainframe LPAR is configured to retrieve the data and return the data to the application via the API; and processing the data.

In one embodiment, the API call is routed based on latency and/or a utilization of the mainframe LPARs.

In one embodiment, the non-transitory computer readable storage medium may also include instructions stored thereon, which when read and executed by one or more computer processors, cause the one or more computer processors to retrieve a dynamic virtual IP address for the identified mainframe LPAR and use the dynamic virtual IP address to communicate with the identified mainframe LPAR.

In one embodiment, the non-transitory computer readable storage medium may also include instructions stored thereon, which when read and executed by one or more computer processors, cause the one or more computer processors to store the data and/or results of the processing of the data with a cloud provider.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
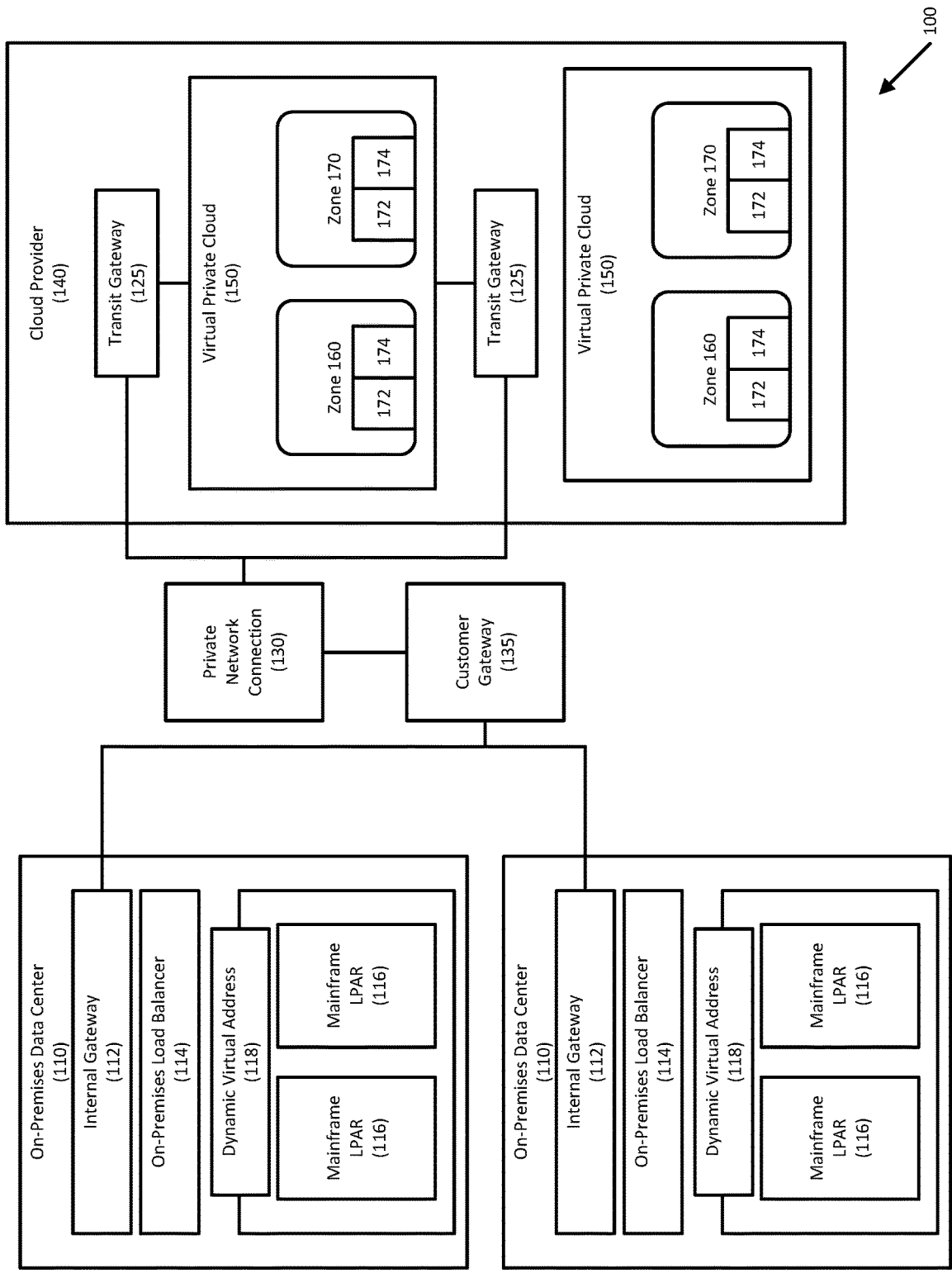
FIG. 1 depicts a system for using serverless functions to call mainframe application programing interfaces according to an embodiment.

Embodiments are generally directed to systems and methods for using serverless functions to call mainframe application programing interfaces. Embodiments may create highly available, fault tolerant hybrid cloud environments between on-premises mainframe systems, such as IBM's z/OS, and any cloud provider.

Embodiments may enable organizations to reuse preexisting mainframe Application Programming Interfaces (APIs) and IBM's Native Stored Procedures (NSPs) to communicate data to cloud data stores and to enhance these serverless functions to migrate data and store in the cloud data stores for future use (e.g., data analytics, machine learning, etc.). Thus, organizations may operate in a hybrid environment (e.g., using an on-premises data center and cloud data storage) until, for example, the organization moves all data to cloud data storage. Examples of data that may be migrated include hierarchical databases (e.g., IMS, IDMS, etc.), relational databases (e.g., DB2), and file systems (e.g., Virtual Sequential Access Method (VSAM), flat files, etc.

In embodiments, a mainframe in the on-premises data center may expose mainframe data via REST micro-services, such as NSPs, on an API layer at an on-premises location. For example, IBM's z/OS Connect is a software platform that enables enterprise applications and services running on IBM z/OS mainframe systems to be accessed and consumed by modern mobile, web, and cloud-based applications through standard RESTful Application Programming Interfaces (APIs). z/OS Connect exposes mainframe assets, such as Customer Information Control System (CICS) and IBM Information Management System (IMS) transactions and DB2, as RESTful APIs that can be easily consumed by client applications. It provides a layer of abstraction between the mainframe and the consuming applications, allowing developers to focus on building modern applications without having to worry about the complexities of mainframe integration.

Cloud microservices, such as lambda functions (also known as serverless functions), may call these REST endpoints via, for example, an API gateway and a cloud connection that connects the on-premises data center with the cloud provider.

Data fetched by making on-premises API calls from the cloud may be housed/kept in a persistent data store on the cloud for ongoing or future use to derive insights into this data using available solutions on cloud for data analytics & machine learning, etc.). This data may be volatile data, such as account balances etc. that cannot be paired with any other data in the cloud to make a personally identifiable information conclusion.

Embodiments may eliminate the need to migrate large amounts of data from on-premises mainframe servers to the cloud for organizations that house their data on-premises on mainframe systems. For example, storing data and applications on mainframes and/or in on-premises data centers may be more reliable, may be more secure, may have higher performance, may be more cost effective than cloud data storage, and may allow the use of legacy applications that are difficult or expensive to migrate to new platforms.

This also facilitates quicker cloud adoption by organizations.

Embodiments may provide security to the data at rest and the data in transit. In embodiments, security may be provided at the infrastructure layer, the network layer, the application layer, and/or the data layer.

At the infrastructure layer and the network layer, security may be provided by the cloud provider and by web application firewalls (WAFs). Security may be provided at the boundary of the network infrastructure where it manages distributed denial of service (DDoS) attacks as well as any other attacks coming from bots, etc.

The cloud provider may use network access control lists that may operate at the subnets (public or private layers where it verifies only known or allowed IP/IP ranges to enter the system). The cloud provider may use security groups that may work at the applications/functions layers running on instances/managed functions on servers. The cloud provider may also use route tables that may provide a managed set of rules for any application running within a private cloud to be able to talk to each other's and request each other's assets.

Once network/infrastructure rules have allowed the traffic to get to the application, identity and access management rules may provide temporary credentials/tokens to access the application based on a collective set of policies assigned to the application as roles.

At the data layer, application developers may ensure that all traffic flow within and outside the application use secure socket layer/transport layer security (SSL/TLS) and encrypt data using keys while the data is in transit or at rest.

Referring to FIG. 1, a system for using serverless functions to call mainframe application programing interfaces is disclosed according to an embodiment. System 100 may include one or more on-premises data centers 110, which may include internal gateway 112, on-premises load balancer 114, and mainframe logical partitions, or LPARs 116. Internal gateway 112 may be an API gateway that exposes APIs that may extract data from mainframe LPARs 116 to cloud provider 140 via private network connection 130 and transit gateway 125. Transit gateway 125 and private network connection 130 may be provided by cloud provider 140 in order to route network traffic to their cloud.

On-premises load balancer 114 may receive a call from cloud provider 140 via internal gateway 112 and may route the API call to the appropriate mainframe LPAR 116 for processing.

On-premises data center 110 may further include dynamic virtual address module 118. Dynamic virtual address module 118 may allow multiple virtual IP addresses to be assigned to a single physical network interface. This improves network availability and scalability. For example, dynamic virtual addresses may be used for load balancing (e.g., incoming traffic is distributed across multiple servers or network devices—by assigning a single virtual IP address to a group of servers, traffic can be routed to the most available and responsive server in the group), to provide high availability (e.g., redundant systems are deployed to provide failover in case of a hardware or software failure. By assigning a virtual IP address to a group of servers, traffic can be automatically rerouted to a standby server in case of a failure), may provide scalability (e.g., allow multiple virtual IP addresses to be assigned to a single physical interface so that services may be added or removed dynamically without disrupting existing services), and for service discovery (e.g., services may be automatically discovered and made available to other services or applications. By assigning a virtual address to a service, other services can discover and access the service using the virtual address.).

Private network connection 130 routes traffic to customer gateway 135, and then to internal gateways 112. Private network connection 130 may provide a networking service that delivers data through a private network connection between on-premises data center 110 and cloud provider 140. An example of such a networking service is AWS' Direct Connect. Customer gateway 135 may be a physical or software appliance that manages the on-premises network connection. Customer gateway 135 may manage ingress traffic to on-premises data center 110.

On-premises load balancers 114 may distribute/forward the traffic to its target groups, such as mainframe logical partitions (LPARs), based on the health of the target groups where it needs to send traffic and get responses from.

Cloud provider 140 may include one or more virtual private clouds 150, and each virtual private cloud 150 may include a plurality of availability zones (e.g., zone 160, zone 170). Each availability zone 160, 170 may include one or more public subnet 172 and one or more private subnets 174. Subnets 172 and 174 may host application servers, databases, etc. that perform the required functions for which the application is designed.

Transit gateways 125 may interconnect virtual private clouds 150 and on-premises data centers 110.

Figure 2:
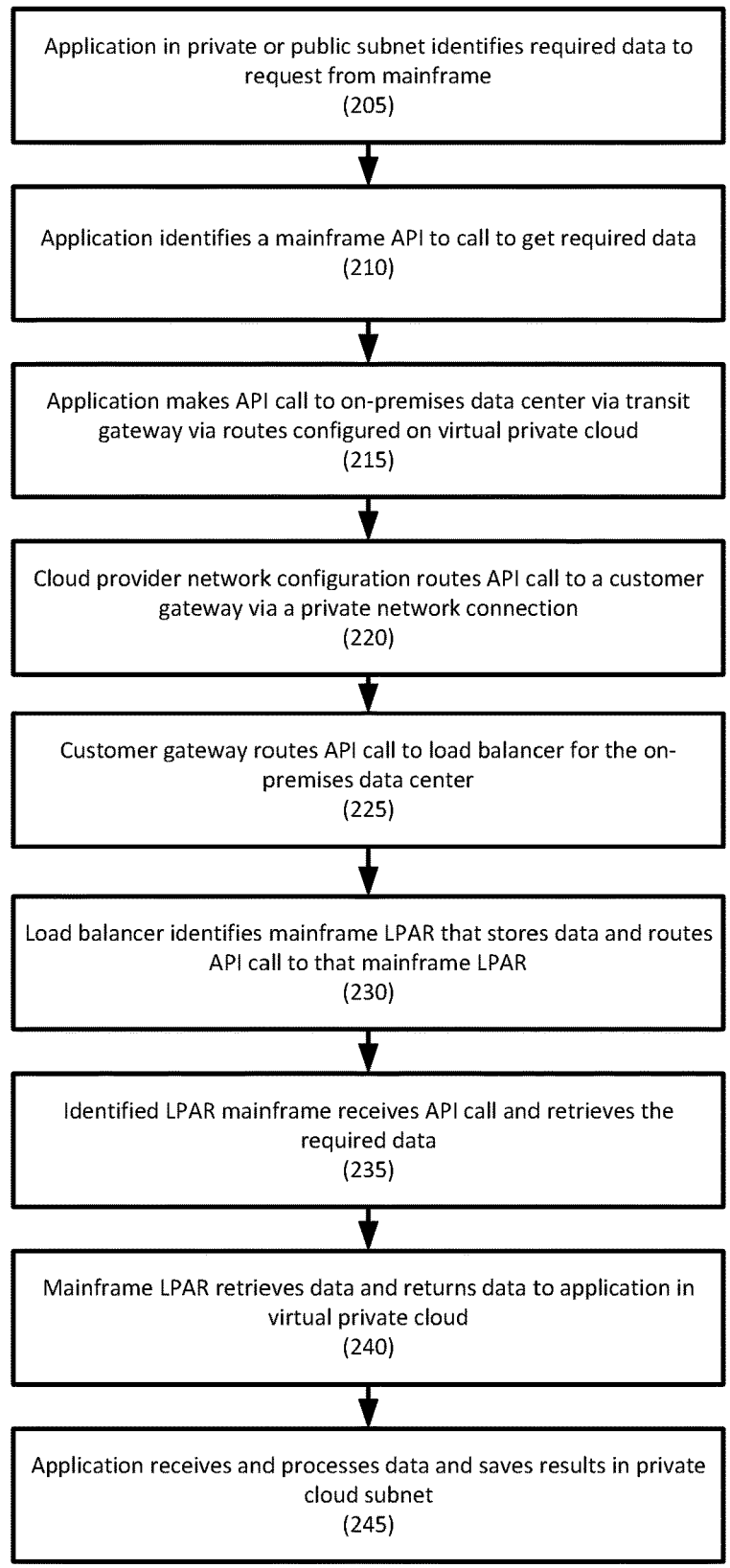
FIG. 2 depicts a method for using serverless functions to call mainframe application programing interfaces according to an embodiment.

Referring to FIG. 2, a method for using serverless functions to call mainframe application programing interfaces is disclosed according to an embodiment.

In step 205, an application in a private or a public subnet provided by a cloud provider may identify required data to request from a mainframe in on-premises data storage.

In step 210, the application may identify a mainframe API to call for the required data. In one embodiment, an internal gateway at the on-premises data center may expose an API that will be used to retrieve the data.

In step 215, using the API, the application may make an API call to the on-premises network via a transit gateway. The transit gateway may use routes configured in the virtual private cloud in the cloud.

In step 220, the cloud provider may route the API call to a customer gateway via a private network connection, such as AWS' Direct Connect.

In step 225, the customer gateway may route the API call to a load balancer for the on-premises data center, and in step 230, the load balancer may identify the mainframe LPAR that stores the data and may route the API call to that mainframe LPAR. In another embodiment, the load balancer may identify a mainframe LPAR that meets a routing condition (e.g., latency, geographic location, utilization, etc.) and may route the API call to that mainframe LPAR.

The load balancer may get a dynamic virtual IP address for the mainframe LPAR and may use the dynamic virtual IP address to connect to the mainframe LPAR.

In step 235, the identified LPAR mainframe receives the API call and may retrieve the required data. In step 240, it may then return the data to the requesting application in the virtual private cloud via the API.

In step 245, the application may receive and process the data. In one embodiment, the application may also save the data and/or results of the processing in a preferred data store on the cloud.

Figure 3:
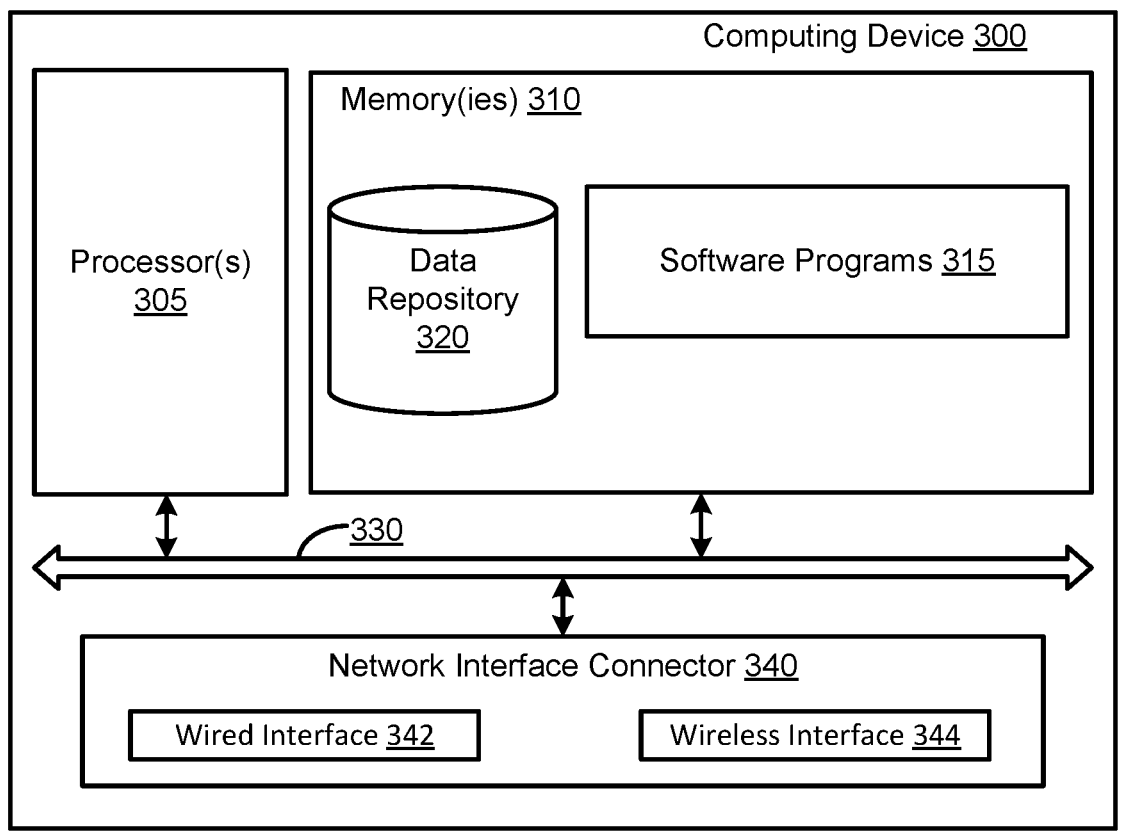
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for using serverless functions to call mainframe Application Programming Interfaces (APIs), comprising:
   identifying, by an application in a private or a public subnet of a virtual private cloud provided by a cloud provider, data to request from a mainframe in an on-premises data center;
   executing, by the application, an API call for the data to the on-premises data center via a transit gateway;
   routing, by the transit gateway, the API call to a customer gateway through a private network connection, wherein the customer gateway routes the API call to a load balancer for the on-premises data center;
   identifying, by the load balancer, one of a plurality of mainframe logical partitions (LPARs) in the on-premises data center that stores the data;
   routing, by the load balancer, the API call to the identified mainframe LPAR, wherein the identified mainframe LPAR is configured to retrieve the data and return the data to the application via the API; and
   processing, by the application, the data.

2. The method of claim 1, wherein the load balancer routes the API call based on latency and/or a utilization of the mainframe LPARs.

3. The method of claim 1, wherein the load balancer retrieves a dynamic virtual IP address for the identified mainframe LPAR and uses the dynamic virtual IP address to communicate with the identified mainframe LPAR.

4. The method of claim 1, further comprising:
   storing, by the application, the data and/or results of the processing of the data in the cloud.

5. A system, comprising:
   a plurality of on-premises data centers, each on-premises data center comprising a plurality of mainframe logical partitions (LPARs) and a load balancer that interfaces with the plurality of mainframe LPARs;
   a customer gateway in communication with the on-premises data centers;
   a cloud provider comprising a virtual private cloud and a transit gateway, the virtual private cloud executing an application; and
   a private network connection between the transit gateway and the customer gateway;
   wherein:
      the application identifies data to request from one of the on-premises data centers;
      the application executes an Application Programming Interface (API) call for the data to the on-premises data center via the transit gateway;
      the transit gateway routes the API call to the customer gateway through the private network connection;
      the customer gateway routes the API call to the load balancer for the on-premises data center;
      the load balancer identifies one of the plurality of mainframe LPARs in the on-premises data center that stores the data;
      the load balancer routes the request to the identified mainframe LPAR;
      the identified mainframe LPAR retrieves and returns the data to the application via the API; and
      the application processes the data.

6. The system of claim 5, wherein the load balancer routes the API call based on a latency and/or utilization of the mainframe LPARs.

7. The system of claim 5, wherein the load balancer retrieves a dynamic virtual IP address for the identified mainframe LPAR and uses the dynamic virtual IP address to communicate with the identified mainframe LPAR.

8. The system of claim 5, wherein the application stores the data and/or results of the processing of the data in the cloud.

9. A non-transitory computer readable storage medium, including instructions stored thereon, which when read and executed by one or more computer processors, cause the one or more computer processors to perform steps comprising:
   identifying data to request from a mainframe in an on-premises data center;
   executing an Application Programming Interface (API) call for the data to the on-premises data center via a transit gateway;
   routing the API call to a customer gateway through a private network connection, wherein the customer gateway is configured to route the API call to a load balancer for the on-premises data center;
   identifying one of a plurality of mainframe logical partitions (LPARs) in the on-premises data center that stores the data;
   routing the API call to the identified mainframe LPAR, wherein the identified mainframe LPAR is configured to retrieve the data and return the data to the application via the API; and
   processing the data.

10. The non-transitory computer readable storage medium of claim 9, wherein the API call is routed based on latency and/or a utilization of the mainframe LPARs.

11. The non-transitory computer readable storage medium of claim 9, further including instructions stored thereon, which when read and executed by one or more computer processors, cause the one or more computer processors to retrieve a dynamic virtual IP address for the identified mainframe LPAR and use the dynamic virtual IP address to communicate with the identified mainframe LPAR.

12. The non-transitory computer readable storage medium of claim 9, further including instructions stored thereon, which when read and executed by one or more computer processors, cause the one or more computer processors to store the data and/or results of the processing of the data with a cloud provider.

\* \* \* \* \*